United States Patent
Insepov et al.

(10) Patent No.: US 9,336,826 B2
(45) Date of Patent: May 10, 2016

(54) METHOD FOR FACILITATING ONLINE INTERACTIONS INITIATED USING OPTICAL DISC PLAYERS

(75) Inventors: Timur Insepov, Sherman Oaks, CA (US); Russell Brian Stewart, Los Angeles, CA (US)

(73) Assignees: SONY CORPORATION, Tokyo (JP); SONY DADC US INC., Terra Haute, IN (US)

( * ) Notice: Subject to any disclaimer, the term of this patent is extended or adjusted under 35 U.S.C. 154(b) by 1621 days.

(21) Appl. No.: 12/706,896

(22) Filed: Feb. 17, 2010

(65) Prior Publication Data

US 2011/0093442 A1 Apr. 21, 2011

Related U.S. Application Data

(60) Provisional application No. 61/252,080, filed on Oct. 15, 2009.

(51) Int. Cl.
| G06F 17/30 | (2006.01) |
| G11B 27/10 | (2006.01) |
| G06Q 30/02 | (2012.01) |
| G11B 27/34 | (2006.01) |

(52) U.S. Cl.
CPC ........ *G11B 27/105* (2013.01); *G06F 17/30867* (2013.01); *G06Q 30/02* (2013.01); *G11B 27/34* (2013.01); *G11B 2220/2541* (2013.01)

(58) Field of Classification Search
CPC .............................................. G06F 17/30867
USPC ........................................................ 707/784
See application file for complete search history.

(56) References Cited

U.S. PATENT DOCUMENTS

| 6,049,835 A | 4/2000 | Gagnon |
| 6,651,217 B1* | 11/2003 | Kennedy et al. ............... 715/224 |
| 2002/0055847 A1 | 5/2002 | Nakano et al. |
| 2008/0301003 A1 | 12/2008 | Harkabi et al. |
| 2009/0150553 A1* | 6/2009 | Collart et al. ................. 709/229 |
| 2010/0034510 A1 | 2/2010 | Oda et al. |

FOREIGN PATENT DOCUMENTS

| EP | 1229476 A2 | 8/2002 |
| JP | 2006067366 | 3/2006 |
| JP | 2006318506 A | 11/2009 |
| WO | 2008105188 A1 | 4/2008 |

OTHER PUBLICATIONS

European Search Report issued Jan. 31, 2011.

* cited by examiner

*Primary Examiner* — Kris Mackes
(74) *Attorney, Agent, or Firm* — Haverstock & Owens LLP

(57) ABSTRACT

Online interactions using optical disc players are facilitated by extracting information from a user request that was initiated from an optical disc player, and then using the extracted information to identify pre-existing user-specific data. A short code, which is specific to the desired online interaction and associated with the extracted information and pre-existing information, is generated and transmitted back to the optical disc player. This short code is then provided back to the back-end server by the user from a secondary consumer electronic device, and used to retrieve associated information, such as the target website for consummating the desired interaction and the previously-identified pre-existing information. Retrieved information is used to populate data fields on the target website prior the user being re-directed to the target website.

2 Claims, 3 Drawing Sheets

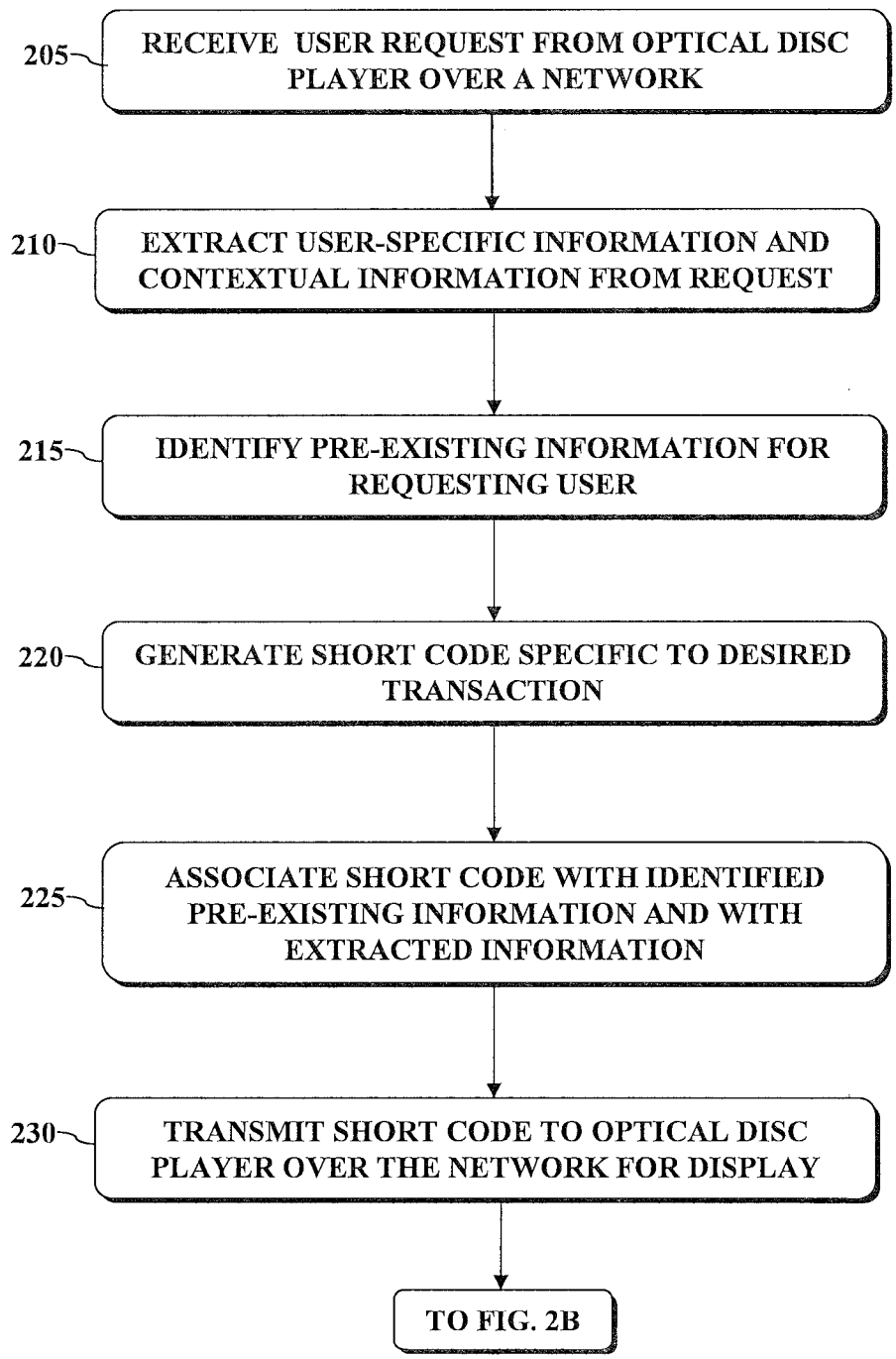

METHOD FOR FACILITATING ONLINE INTERACTIONS INITIATED USING OPTICAL DISC PLAYERS

CROSS REFERENCE TO RELATED APPLICATION

This application claims the benefit of U.S. Provisional Application No. 61/252,080, filed Oct. 15, 2009.

FIELD OF THE INVENTION

The present invention relates in general to simplifying online interactions initiated using an optical disc player, and in particular to an improved approach for streamlining online interactions by minimizing the amount of data entry required by the user of the optical disc player.

BACKGROUND

Initiating online interactions using a network-capable optical disc player, such as Blu-ray™ players, often requires that a large amount of information be provided by the user. However, optical disc players are woefully inadequate when used to input data. This creates a cumbersome and inconvenient process for optical disc player users to benefit from the online commercial offerings and extended online services which are more recently being offered to such users.

By way of example, optical disc players, such as Blu-ray™ players, are increasingly network-capable and users are provided the opportunity to engage in various online interactions using various services, such as the service marketed under the trademark of BD Live™, for example. Such online services and content may include e-commerce, online chats, online games, downloadable featurettes, downloadable quizzes, downloadable movie trailers, etc. However, taking advantage of such offerings often requires the user to input multiple fields of information using their optical disc player remote controls. In the context of an online purchase using a credit card, for example, the user would not only have to manually enter credit card information, but would also have to complete numerous additional data fields, such as name, address, phone number, etc.—all the while using the device's remote control.

Thus, what is needed is an improved approach for facilitating online interactions that are initiated using an optical disc player.

BRIEF SUMMARY OF THE INVENTION

Disclosed and claimed herein are methods and systems for facilitating online interactions. In one embodiment, the method includes extracting user-specific information and contextual information from a user request that corresponds to a desired online interaction, where the user request is provided by an optical disc player over a network connection. The method further includes identifying, using the user-specific information, pre-existing information corresponding to the user, and then generating a short code that is specific to the desired online interaction, where the short code is associated with the user-specific information, contextual information and at least a portion of the pre-existing information. Finally, the short code is transmitted over the network to the optical disc player from which the user request was received.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2A depicts a process for carrying out one or more aspects of the invention.

DETAILED DESCRIPTION OF EXEMPLARY EMBODIMENTS

Disclosure Overview

Figure 1:
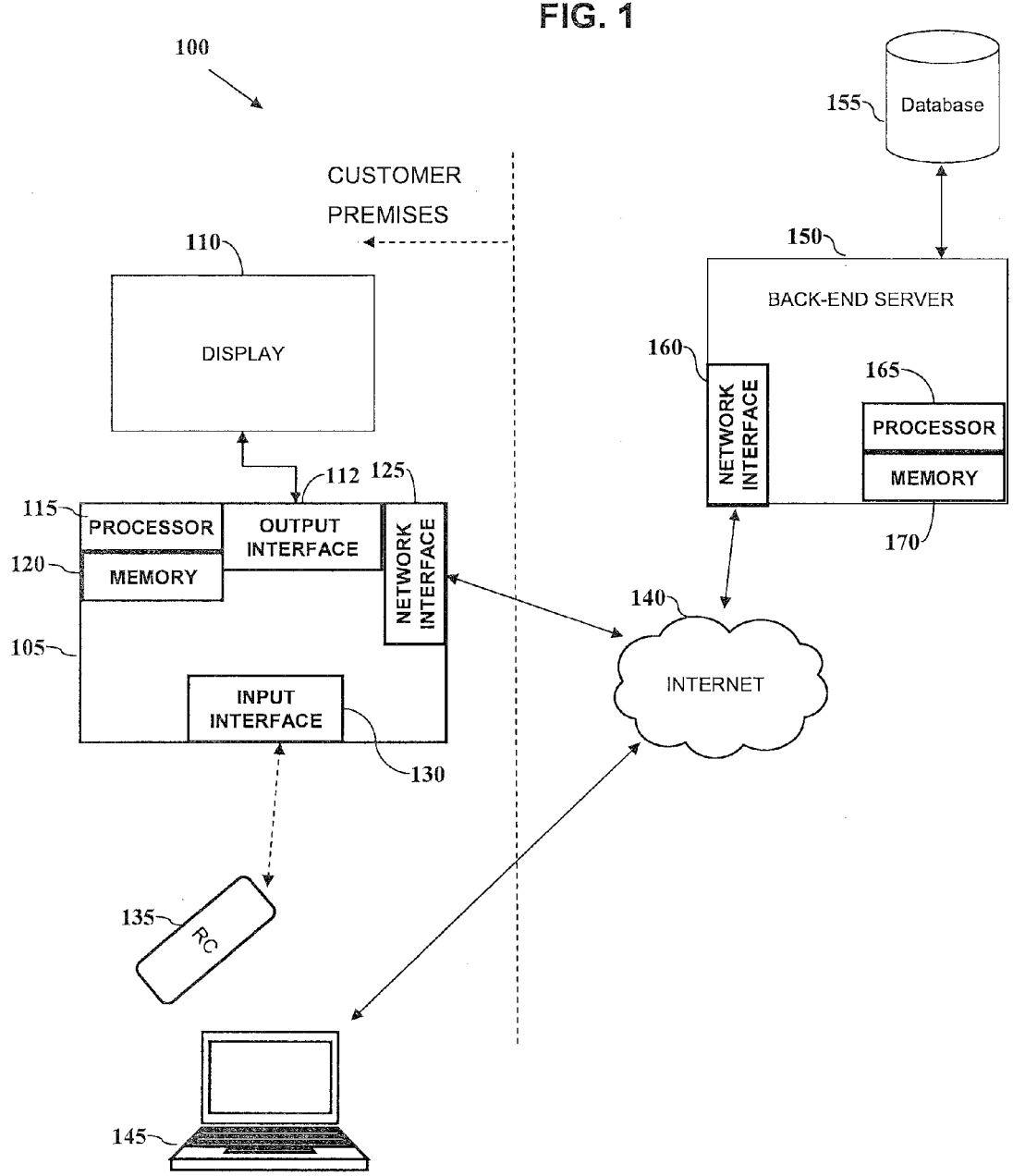
FIG. 1 is a block diagram of a system configured in accordance with one embodiment of the invention.

The following disclosure relates to streamlining online interactions by minimizing the amount of data entry required by a user of the optical disc player. In particular, one aspect of the present disclosure relates to extracting information from a user request that was initiated from an optical disc player. At least a portion of the extracted information may then be used to identify if there is any pre-existing data available that corresponds to the requesting user. A short code may then be generated and transmitted back to the optical disc player over the network, where the generated short code is specific to the desired online interaction and associated with the extracted information and at least a portion of the pre-existing information.

Another aspect of the invention is to then enable the user to provide the short code back to the back-end server from a secondary consumer electronic device, such as a personal computer, laptop, personal digital assistant or smartphone. The received short code can then be used to retrieve associated information, such as the target website for consummating the desired interaction and at least a portion of any previously-identified pre-existing information. This retrieved information may then be used to populate one or more data fields on the target website prior to the user being re-directed to the website. In this fashion, the user need not enter multiple website addresses and related personal information in order to engage in any number of different online interactions.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the processor-executable code segments to perform the necessary tasks. The code segments can be stored in a "processor readable medium," which includes any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

Exemplary Embodiments

FIG. 1 depicts a system 100 configured in accordance with the principles of the invention. In particular, system 100 includes an optical disc player 105, such as a Blu-ray™ player. The optical disc player 105 is coupled to a display 110 via an output interface 112 (e.g., HDMI, S-video, etc.). The optical disc player 105 further includes a processor 115, a memory 120, a network interface 125 and at least one input interface 130. An input device, such as remote control 135, may be used to provide various inputs to the optical disc player 105 via the input interface 130. In one embodiment, the network interface 125 is configured to connect the optical disc player 105 to the Internet 140.

In one embodiment, the processor 115, which may be implemented as one or more separate processors, is configured to control the functionality of the optical disc player 105, including displaying various messages associated with any interactive services and content that may be available to the user. Memory 120 may contain executable instruction sequences for operating and controlling optical disc player 105.

The optical disc player 105 may be configured to decode (play) various types of optical discs, such as a Blu-ray Disc™, which may contain not only multimedia content, but also additional user-selectable options for engaging in online interactions, including online purchasing (i.e., e-commerce), online chats, online games, downloadable featurettes, downloadable quizzes, downloadable movie trailers, etc. When authored, such optical discs may be encoded with one or more menus from which a user may select one or more interaction options using, for example, the remote control 135.

Continuing to refer to FIG. 1, also depicted is a user computer 145, which can be any Internet-capable computer, mobile phone or the like, that is capable of accessing web pages via a browser-type application or graphical user interface. Each of the user computer 145 and optical disc player 105 are located on the customer premises, and are able to communicate with a back-end server 150 over the Internet 140.

The back-end server 150 may also be associated with one or more databases (i.e., database 155), which may contain user-specific information, transaction-specific information and/or device-specific information. Moreover, each of the user computer 145 and optical disc player 105 are configured to access the Internet 140 using separate connection, or a shared connection (e.g., wireless LAN).

The back-end server 150 may further comprise its own network interface 160, processor 165 and memory 170. The network interface 160 may be configured to connect the server 150 to the Internet 180, or any other network. The memory may contain processor-executable instructions, which when executed by processor 165, causes the server 150 to perform the process detailed below with respect to FIGS. 2A-2B.

Referring now to FIG. 2A, depicted is a process for carrying out one or more aspects of the invention using an optical disc player (e.g., optical disc player 105 of FIG. 1). In certain embodiments, process 200 may be performed by a back-end server, such as server 150 of FIG. 1, which is configured to communicate with the optical disc player over a network connection, such as Internet 140.

In any event, process 200 begins at block 205 where the back-end server receives a user request from an optical disc player over the Internet 140. In certain embodiments, the user request may be a request to engage in an online interaction using the optical disc player. The user request may be made using one or more menus, displayed by the optical disc player, from which the user may select one or more interaction options using, for example, the remote control 135. The user request may be a request to make an online purchase, participate in an online chat, online gaming, download multimedia content, etc.

When an optical disc is authored, interactive icons may be incorporated into its content. When such an icon is selected, a request may be generated that indicates what the desired interaction is, e.g., buy a specifically-identified disc, register a particular disc, etc. However, in addition to simply indicating what the desired interaction is, one aspect of the invention is for the user request to also be coded with user-specific information and other contextual information relevant to the desired online interaction. The user-specific information may comprises a unique ID specific to the particular optical disc player being used to submit the request, or a unique ID that has been assigned to the household or even to the particular user. In certain embodiments, the user-specific information may be a cryptographic hash representative of the particular user, device or household.

The contextual information may include information about what content the user may have been viewing at the time the request was submitted, what menu was currently active (e.g., registration menu, ecommerce menu, etc.), what type of player is being used to make the request, the location of the user (based on IP address resolution), a history of viewed content for the user/player (e.g., trailers, full films, etc.), a request by the user to submit text to the player via a remote keyboard, a request to use the remote device as an additional remote for playback control, a request to verify the disc as authentic (as opposed to an illegitimate copy) by sending a machine readable code embedded in the disc to the server, a request for machine readable code to be sent to provide specific offers or discounts related to the retailer from whom the user purchased the disc, etc. The user request may also include the actual item or activity that is desired (e.g., name of movie to register, name of disc to purchase, etc.).

Once the user request has been received, process 200 may then continue to block 210 where the user-specific information and other contextual information may be extracted and stored in a database (e.g., database 155).

Process 200 may then continue to block 215 where the user-specific information (i.e., cryptographic hash of user/ device) may be used to lookup whether any pre-existing information for the requesting user is available (e.g., lookup operation of database 155). Such pre-existing information may originate from previous product registration information provided, previously-provided credit card information, previously-purchased items, etc. The specific types of information that these types of previous activities may yield include the user's name, address, telephone number, credit card details, media format preferences, viewing history, player setting preferences, username and password, retailer-specific offers or discounts, theater information for upcoming releases or additional studio releases based on the users location, customized weather, news or sports information, friends list for new or existing social network or instant messaging sites, live search parameters for searching for information related to the movie, studio, actor, setting, users eligibility for specific offers, free merchandise, prizes or digital information.

Process 200 may then continue to block 220 where a short code, unique to the desired transaction, may be generated. Since one aspect of the invention is to minimize the amount of data entry required by the user of the optical disc player, the short code generation process may be comprised of a sequence of sub-processes that determine the shortest code that is still available for use. As such, the back-end server may also track short code usage so as to identify when a previously assigned short code becomes available again for re-use. Short codes may also be given a limited duration so as to ensure they can be eventually re-used for another user request.

Ideally, the short code may be between 4 and 6 digits, but may equally be comprised of more or fewer digits. However, if too few digits are used, the same short codes may inadvertently be provided to more than one user since there may be more short code requests than available unused codes. Conversely, if too many digits are used, the process may become too cumbersome.

It should be understood that the short code may be generated using a random number generator, or may simply be the next available code along a sequence of available codes. In any event, the short code that is generated is representative of the desired transaction. Thereafter, at block 225, the short code may be associated with the user-specific information, contextual information and some or all of the identified pre-existing information (see block 215). These associations may be stored in a relational database, such as database 155.

It should further be appreciated that not all pre-existing information and contextual information need be associated with the generated short code, however. For example, if the user request received at block 205 is not a purchase-based request, there would be no need to associate the user's credit card information with the short code, even if known.

Finally, at block 230, the generated short code may be transmitted back to the optical disc player for display to the user. At that point, the user will have a short alphanumeric sequence that implicitly includes all the details of the desired online interaction, as well as all of the user's known and relevant information. In certain embodiments, the optical disc player may also display a web address (URL) of a website into which the short code may be entered. In a preferred embodiment, the web address may be a simple, generic address that is not specific to the desired transaction (e.g., bdlink.me).

Alternatively, the short code may be displayed on a display coupled to the optical disc player in a non-alphanumeric manner, such as in the form of a bar code. The user may then use a camera, such as a cell phone camera, to capture the image of the bar code. In this fashion, the user may avoid having to manually enter any text at all since the image can readily be converted into an underlying value using known techniques, and automatically uploaded to the aforementioned website.

Figure 2B:
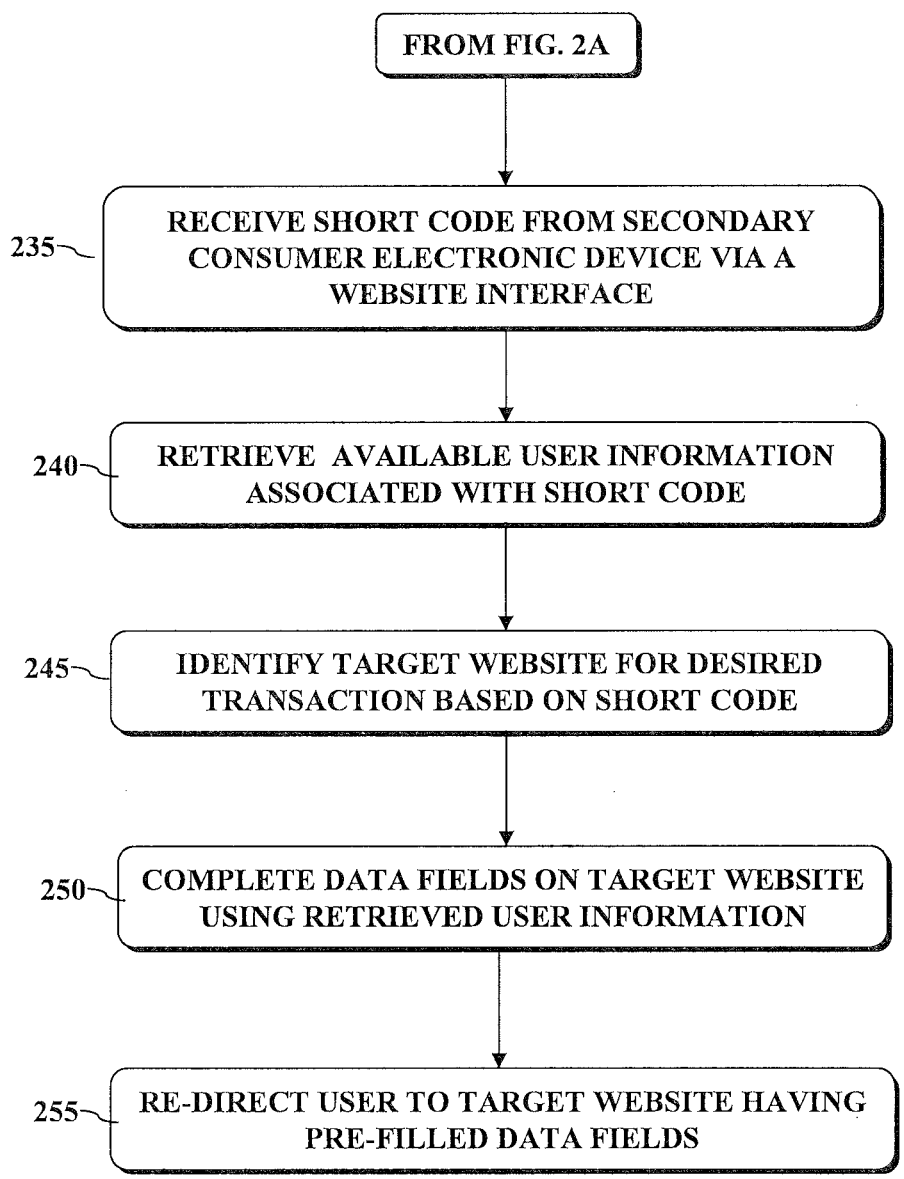
FIG. 2B depicts a process for carrying out one or more additional aspects of the invention.

Referring now to FIG. 2B, process 200 continues to block 235 where the previously-generated short code (block 220) may be provided by the user to a predetermined website using a secondary consumer electronic device, such as a user computer or mobile phone, that is Internet-capable (e.g., user computer 145). The short code displayed to the user above at block 230 should preferably be written down, memorized or otherwise captured by the user, and then provided back to the back-end server (e.g., back-end server 150) by the same user at block 235 using a browser-capable consumer electronic device. In certain embodiments, the user provides the short code by first visiting a simple web address (e.g., bdlink.me) that operates as a portal for accepting short codes from users for any type of desired transaction. The website's interface may contain a fillable field into which the short code may be entered by the user. The website to which the user provides the short code may of course have other features and functions, but would preferably be a simple web address that is used for a myriad of desired online interactions.

In any event, once the short code is received by the back-end server, process 200 may continue to block 240 where information may be retrieved from a database using the short code. By way of example, the short code may be used to perform a database lookup of any associated information, such as the extracted and pre-existing information that was previously associated with the short code at block 225. Additionally, it should be appreciated that only types of information relevant to the desired interaction may be retrieved at block 240.

Based on at least a portion of the information retrieved at block 240, the target website corresponding to the desired transaction may then be identified at block 245. In particular, since the short code itself will have been associated with information corresponding to the desired transaction, the website on which the desired transaction may be consummated would be identifiable. For example, the target website would be an ecommerce website when the user request (block 205) was a request to purchase a particular optical disc. Similarly, the target website would correspond to a registration server when the user request (block 205) was a request to register an optical disc.

Once the target website has been identified at block 245, process 200 may continue to block 250 where at least a portion of the information retrieved at block 240 may be used to pre-fill or populate one or more data fields on the target website. By way of a non-limiting example, the credit card number field of an ecommerce website may be automatically completed or pre-filled with information that was previously associated with the particular user who submitted a purchase request. Similarly, the name and address fields on a registration website may be automatically completed or pre-filled with the user's name and information previously associated with the short code generated for the desired interaction (block 220) and provided by the user (block 235).

At this point, the user (i.e., the user's browser application) may be automatically re-directed to the target website having one or more of its data fields already completed. In this fashion, a number of efficiencies and conveniences may be realized. First, the user need not remember or manually enter multiple website addresses to engage in different online interactions since only a single, simple portal address can be used to enter all short codes—regardless of what the user is requesting to do. Second, the user need not re-enter previously-provided personal information since such information already will have been associated with the generated short code and automatically retrievable from both the user-specific information that was extracted from the request at block 210, as well as any pre-existing information identified at block 215. Third, the user need not enter request-specific information since the contextual information from the original request will have been similarly extracted (block 210) and used to generate a short code unique to the desired transaction (block 220). It should be appreciated that other advantages may be realized using the principles of the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method facilitating online interaction comprising the acts of:
    extracting user-specific information and contextual information from a user request that corresponds to a desired online interaction, wherein the user request is provided by an optical disc player over a network connection;
    identifying, using said user-specific information, pre-existing information corresponding to said user;
    generating a short code, specific to the desired online interaction, that is associated with the user-specific information, contextual information and at least a portion of the pre-existing information;
    transmitting the short code over the network to the optical disc player from which the user request was received; and
    wherein the user request is generated upon the user selecting an online interaction option that is displayed by the optical disc player.

2. A back-end server comprising:
    a network interface;
    a memory containing computer-executable instructions; and
    a processor coupled to the memory and the network interface, wherein the processor is configured to execute the computer-executable instructions to,
        extract user-specific information and contextual information from a user request that corresponds to a desired online interaction, wherein the user request is provided by an optical disc player over a network connection,
        identify, using said user-specific information, pre-existing information corresponding to said user,
        generate a short code, specific to the desired online interaction, that is associated with the user-specific information, contextual information and at least a portion of the pre-existing information,
        transmit the short code over the network to the optical disc player from which the user request was received, and
    wherein the user request is generated upon the user selecting an online interaction option that is displayed by the optical disc player.

* * * * *